(12) United States Patent
Peterschmidt et al.

(10) Patent No.: US 7,902,685 B2
(45) Date of Patent: Mar. 8, 2011

(54) FEED CONVERTER SYSTEM

(75) Inventors: Nico Peterschmidt, Wallenhorst (DE); Jakob Schmidt-Reindahl, Frankenfeld (DE); Torsten Leifert, Vögelsen (DE); Katrin Bystry, Thomasburg (DE); Rainer Buchhorn, Vögelsen (DE); Holger Peters, Schortens (DE)

(73) Assignees: Sieb & Meyer AG, Lüneburg (DE); INENSUS GmbH, Goslar (DE)

( * ) Notice: Subject to any disclaimer, the term of this patent is extended or adjusted under 35 U.S.C. 154(b) by 545 days.

(21) Appl. No.: 12/009,517

(22) Filed: Jan. 18, 2008

(65) Prior Publication Data

US 2008/0174116 A1 Jul. 24, 2008

(30) Foreign Application Priority Data

Jan. 19, 2007 (DE) .......................... 10 2007 002 986
Aug. 22, 2007 (DE) .......................... 10 2007 039 726

(51) Int. Cl.
*H02P 9/10* (2006.01)
(52) U.S. Cl. ............................................ 290/44; 322/25
(58) Field of Classification Search .................... 290/44; 322/25
See application file for complete search history.

(56) References Cited

U.S. PATENT DOCUMENTS

| 6,856,040 | B2* | 2/2005 | Feddersen et al. | 290/44 |
| 6,900,998 | B2* | 5/2005 | Erickson et al. | 363/159 |
| 7,180,270 | B2* | 2/2007 | Rufer et al. | 322/20 |
| 7,289,329 | B2* | 10/2007 | Chen et al. | 361/707 |
| 7,476,987 | B2* | 1/2009 | Chang | 290/55 |
| 7,629,705 | B2* | 12/2009 | Barker et al. | 290/55 |
| 2004/0032127 | A1 | 2/2004 | Tokiwa et al. | |
| 2006/0023478 | A1* | 2/2006 | Takeda et al. | 363/97 |
| 2006/0137214 | A1 | 6/2006 | Achenbach | |
| 2007/0013194 | A1* | 1/2007 | Calley | 290/44 |

FOREIGN PATENT DOCUMENTS

| DE | 31 51 851 | 7/1983 |
| DE | 101 05 892 | 9/2002 |
| DE | 102 45 103 | 4/2004 |
| DE | 10 2005 019 609 | 11/2006 |

OTHER PUBLICATIONS

German Search Report with English translation of the relevant parts.
Valentine, Mark, "Residential Wind Turbine Integrates Advanced Inverter," Power Electronics Technology, Jul. 19, 2006, Penton Media, Inc., pp. 1-3. http://powerelectronics.com/power_systems/wind_turbine_inverter (German SR).
"SMA WindyBoy 500VDC 4KW Rectifier & Over Voltage Protection Box," Energy Matters, Jan. 10, 2007, pp. 1-2. http://www.energymatters.com.au/sma-windyboy-500vdc-4kw-rectifier-over-voltage-protection-box-p-1128.html (German SR).

(Continued)

*Primary Examiner* — Michael C Zarroli
(74) *Attorney, Agent, or Firm* — Collard & Roe, P.C.

(57) ABSTRACT

A feed converter system for small wind energy systems has a rectifier device and an inverter device disposed in a housing, and a common control device is provided for regulating the system components under different load cases, particularly when the wind energy system starts up, or when it is being operated at an optimal operating point.

12 Claims, 1 Drawing Sheet

OTHER PUBLICATIONS

"SMA Windy Boy Protection Box", Technische Information, retrieved on Dec. 3, 2008, pp. 1-11. http://download.sma.de/smaprosa/dateien/7349/WBP-UDE083910.pdf (German SR).

"SMA Windy Boy Protection Box", Technische Beschreibung, 2004-2008, SMA Solar Technology AG, retrieved on Dec. 3, 2008, pp. 1-31. http://download.sma.de/smaprosa/dateien/6197/WBP-TDE081110.pdf (German SR).

* cited by examiner

U.S. Patent

FEED CONVERTER SYSTEM

CROSS REFERENCE TO RELATED APPLICATIONS

Applicants claim priority under 35 U.S.C. 119 of German Application No. DE 10 2007 002 986.3 filed Jan. 19, 2007 and German Application No. DE 10 2007 039 726.9 filed Aug. 22, 2007.

BACKGROUND OF THE INVENTION

1. Field of the Invention

The invention relates to a feed converter system for small wind energy systems.

2. The Prior Art

Inverter devices are known from the photovoltaic sector, with which the direct voltage obtained from photo cells can be converted into alternating voltage of a suitable number of volts for the operation of household appliances, for example, or for feed into the power network. Such devices from the photovoltaic sector are usually also used in connection with small wind energy systems, since devices specifically developed for small wind energy systems are often not economically efficient. However, since the wind energy systems are generally equipped with alternating current generators, a rectifier has to be additionally disposed between generator and inverter, in contrast to photovoltaic systems, in order to convert the alternating current having variable frequency, generated by the generator, into an alternating current having a constant frequency of 50 Hz or 60 Hz, which is suitable for being fed into the power network. However, such a combination of devices is complicated during installation, and is not easily manageable, because of the need for different devices. In addition, there is the fact that the small wind energy systems require additional load resistors for start-up or as over-voltage protection, so that at least one additional device is added, further increasing the aforementioned disadvantages.

SUMMARY OF THE INVENTION

It is therefore an object of the invention to provide a feed converter system for small wind energy systems that can be produced and installed in economically efficient manner, and allows the most economically efficient operation of the wind energy system.

This object is accomplished by a feed converter system comprising a rectifier device and an inverter device disposed in a housing, and a common control device for regulating the system components under different load cases, particularly when the wind energy system starts up, or when it is being operated at an optimal operating point. Because of the accommodation of rectifier and inverter in a single housing, a single device is obtained, which can be installed in particularly simple manner, and makes available the required functions for feed of the current obtained in the wind energy system into the power network. The common control device ensures that the feed converter system adapts to all the significant operating states of the wind energy system, and guarantees optimized start-up of the wind energy system, in particular, and setting of an optimal operating point during normal operation.

In an embodiment of the invention, the control device is configured to regulate the system components as a function of the measurement variables of voltage and/or current, as well as their frequency, and/or the speed of rotation of a synchronous generator of the wind energy system. Taking the aforementioned parameters into consideration allows the best possible adaptation to all the operating states.

If a load resistor that serves for start-up of the wind energy system and/or for over-voltage protection is integrated into the housing of the feed converter system, the compactness and simple manageability of the system is further improved. Optionally, the load resistor can be broken up into an internal load resistor having a low power, for over-voltage protection, and an external load resistor having a greater power. Optimally, the external load resistor can be air-cooled or water-cooled.

In an embodiment of the invention, a fan is integrated into the housing of the feed converter system, which only circulates the air within the housing, whereby the device cooling takes place by means of external natural air convection. This measure allows a sealed housing without ventilation openings, thereby resulting in a better type of protection of the feed converter system according to IP65.

In an embodiment of the invention, the control device is connected with consumers by way of an interface, and comprises consumption management that regulates the flow of energy from the wind energy system to the consumers and/or into the power network, or from the power network to the consumers, as a function of the operating state of the wind energy system. The consumption management is preferably integrated into the control device in the form of a computer program. In the case of low or no wind, it allows purchase of power from the power network to feed the consumers. As soon as the wind energy system supplies sufficient power, the consumers are then switched over for operation on the house power network. If less power is available than the consumers need, the power additionally required is purchased from the public power network. If more power from wind energy is available than the consumers need, the excess energy is fed into the power network.

In a further development of the measure last described, it is provided that the interface between control device and consumers comprises radio transmission of the control and regulation signals. In this embodiment, it is possible to do without laying signal lines. The electronics for radio transmission are, of course, also integrated into the same housing as the other components of the feed converter system. Preferably, the radio standard Zigbee 805.3 is used.

In an embodiment of the invention, a measurement point is provided in the transition region between a house network and the power network of a utility company, which point is connected with the control device by way of a data channel and transmits data concerning the power flow at the transfer point over this channel. Using the data of this measurement point, the electricity consumers in the house, which can be added and regulated, can be regulated in such a manner that the maximal electric power is used up in the house itself, and not fed into the power network.

In a particularly cost-advantageous and advantageous embodiment, the load resistor can be added as an additional consumer, to prevent the feed of excess energy into the power network, and the heat that occurs at the load resistor can be used for heating hot water or for heating. In this manner, the load resistor that otherwise serves for start-up of the wind energy system or as over-voltage protection, which is present in any case, is additionally utilized, without the need for the installation of a separate consumer. Of course, this utilization is only practical if the excess energy can be used in the house in a useful manner, instead of being fed into the power network. Here, heating hot water or heating the house by means of the heat that occurs at the load resistor is a useful effect.

In a further development of the invention, a heat pump can be added as an additional consumer, to avoid the feed of excess energy into the power network, and the heat pump can be used for heating or cooling. In contrast to the use of the load resistor as an additional consumer, the heat pump is more complicated in terms of design, but yields a greater benefit than the load resistor, because more heat is available for heating, and cooling is also possible.

The aforementioned embodiment can be further improved if the heat pump is disposed directly on the direct current intermediate circuit of the feed converter, by way of an inverter, and can be regulated by means of the control device. In this way, the losses that otherwise occur during the further conversion of the electrical energy can be saved.

As a further improvement of the invention, it is proposed that the control device is programmed in such a manner that it allows a deviation from the optimal operating point for a short time, during rapid increases of the speed of rotation or of the output of the synchronous generator, and then slowly returns to the optimal operating point. If the speed of rotation or the output of the synchronous generator increases relatively rapidly, this is generally attributable to wind gusts. However, since wind gusts generally last only a short time, it might not be advisable to add additional consumers in order to absorb the additional energy flow. If the control device now permits a higher speed of rotation, for a short time, than at the optimal operating point, the additional energy contained in the wind gusts is temporarily stored as rotation energy of the rotor of the wind energy system. Afterwards, this additional energy is slowly used up, in that the control device slowly regulates the speed of rotation down, until the optimal operating point has been reached again. This inventive measure allows continuous, uniform utilization of the electric energy for consumers that are classified as having a higher value, for some reason, but whose power consumption is limited in an upward direction. The measure according to the invention therefore allows preferring the "higher-value consumers" over the other consumers.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

DETAILED DESCRIPTION OF THE PREFERRED EMBODIMENT

Figure 1:
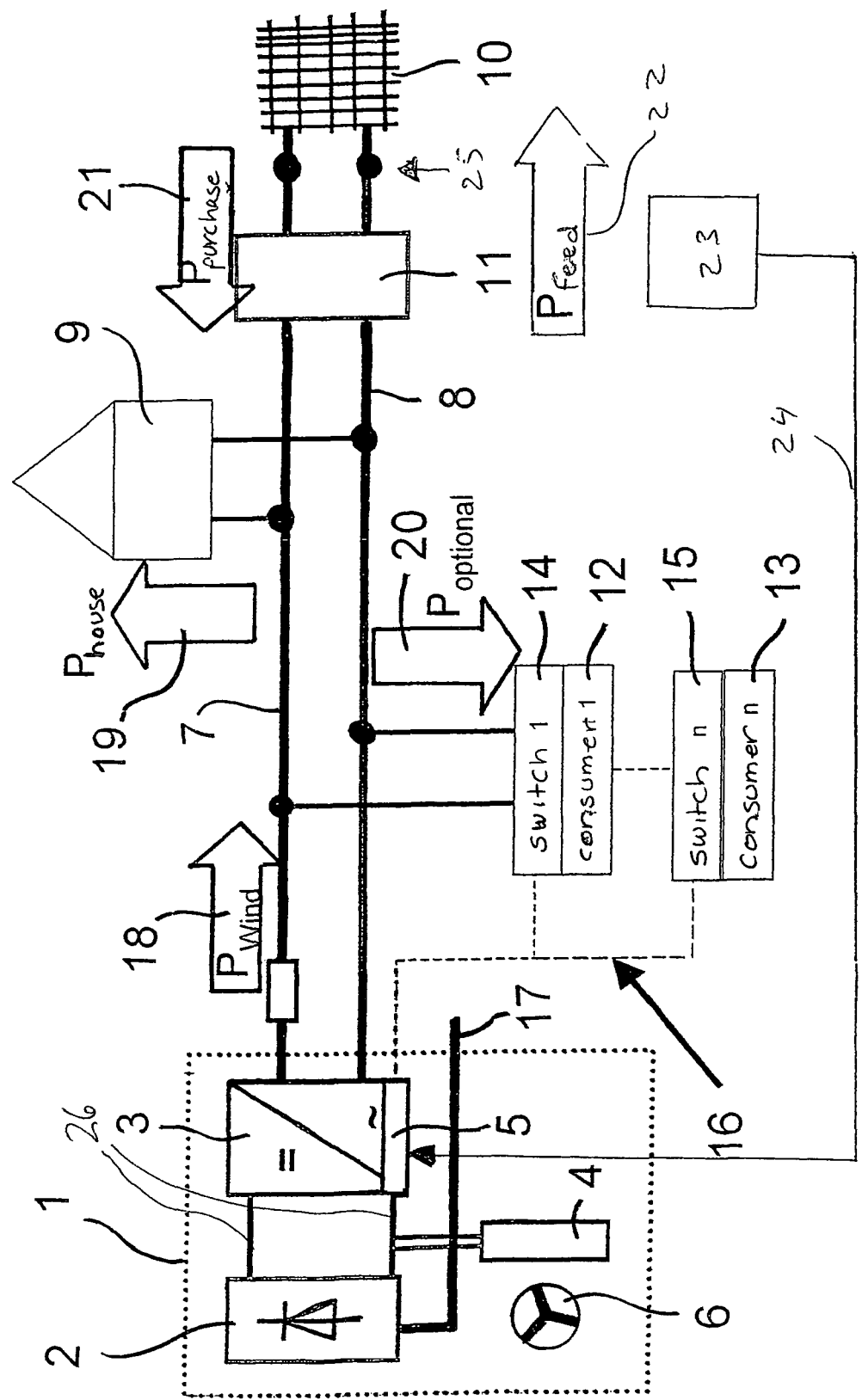
FIG. 1 shows a block schematic with a feed converter system according to the invention.

Referring now in detail to the drawing, housing 1 of a feed converter system according to the invention is shown by means of a dotted line. A rectifier 2 and an inverter 3 are integrated into the housing 1, and are connected with one another by way of a direct current intermediate circuit 26. Furthermore, a load resistor 4 is disposed in the housing 1, and electrically connected with the other system components. A control device 5, which is also disposed in the housing, serves for control. Finally, housing 1 also comprises a fan 6, with which the air in the interior of housing 1 is circulated. This guarantees that the heat is removed from electric system components 2, 3, 4, 5 and transported to the inside wall of housing 1. The ambient air flows around housing 1 on the outside, and thereby cools it.

Inverter 3 of the feed converter system is connected with electricity consumers 9 of a residence, on the one hand, and with power network 10, on the other hand, by way of electricity lines 7, 8. An electricity meter 11 is disposed in the immediate vicinity of the connection to power network 10. Furthermore, additional consumers 12, 13 can optionally be added at electricity lines 7, 8. For this purpose, each consumer 12, 13 has a switch 14, 15 assigned to it. Switches 14, 15 are connected with a consumption management of control device 5 by way of a radio interface indicated with broken line 16.

During normal operation of the wind energy system, the alternating current generated by a synchronous generator of the wind energy system, which has a variable frequency, depending on the speed of rotation of the rotor of the wind energy system, flows to the rectifier 2 by way of the feed line 17. There, the alternating current having a variable frequency is rectified. Load resistor 4 serves as protection against overvoltage, and is also needed when the wind energy system starts up from a standstill. The direct current obtained in this manner is converted to an alternating current having a constant frequency of 50 H, in inverter 3, and regulated to a voltage of 230 V. Electric power 18 ($P_{wind}$) that comes from the wind energy system and is converted in feed converter system gets to electricity consumers 9 of the residence by way of electricity lines 7, 8.

If a minimal electric power 18 from wind energy to be parameterized is available, the optional consumers 20 are released for operation. Depending on the programming of the consumption management in control device 5, the latter adds any desired number of additional consumers 12, 13 by means of switches 14, 15. If the wind energy is not completely used up by optional consumers 12, 13 and non-switchable household consumers 9, the excess energy is fed into power network 10.

If the wind energy system cannot make as much electric power 18 available as needed, the consumption management turns the optional consumers off. In this connection, control device 5 takes into consideration operating variables such as speed of rotation, frequency, voltage, and current of the generator of the wind system.

Furthermore, a measurement point 23 is disposed in the region of a transfer point 25 between the local house network and power network 10 of the utility company. Measurement point 23 is connected with control device 5 by way of a data channel 24. Data channel 24 can be configured as a cable, but also without a cable, particularly as a radio connection. By means of measurement point 23, control device 5 constantly receives current data about the power $P_{purchase}$ purchased from power network 10 and the power $P_{feed}$ fed into power network 10, so that the power flows can be regulated by means of program-controlled reactions of control device 5.

Accordingly, while only a few embodiments of the present invention have been shown and described, it is obvious that many changes and modifications may be made thereunto without departing from the spirit and scope of the invention.

REFERENCE SYMBOL LIST 1 housing
2 rectifier
3 inverter
4 load resistor
5 control device
6 fan
7 electricity line
8 electricity line
9 electricity consumer 10 power network
11 electricity meter
12 consumer
13 consumer
14 switch
15 switch
16 broken line/radio interface
17 feed line from the generator of the wind energy system
18 electric power from wind energy system Pwind
19 electric power for residence Phouse
20 electric power for optional consumer(s) Poptional
21 electric power from the power network Ppurchase
22 electric power into the power network Pfeed
23 measurement point
24 data channel
25 transfer point
26 direct current intermediate circuit

What is claimed is:

1. A feed converter system for small wind energy systems, comprising:
    a housing;
    a rectifier device disposed in the housing;
    an inverter device disposed in the housing; and
    a common control device for regulating system components under different load cases,
    wherein the heat pump is disposed directly on a direct current intermediate circuit of the feed converter system, by way of an inverter, and is regulated by the control device.

2. The system according to claim 1, wherein the control device is configured to regulate the system components as a function of measurement variables of voltage, current, frequency, or speed of rotation of a synchronous generator of the wind energy system.

3. The system according to claim 1, further comprising a load resistor that serves for start-up of the wind energy system or for over-voltage protection, said load resistor being integrated into the housing.

4. The system according to claim 1, further comprising an internal load resistor having a low power and being integrated into the housing, for over-voltage protection.

5. The system according to claim 4, further comprising an external load resistor having a great power and being air-cooled or water-cooled, said external load resistor being disposed outside of the housing.

6. The system according to claim 1, further comprising a fan integrated into the housing of the feed converter system, said fan only circulating air within the housing, wherein device cooling takes place by external natural air convection.

7. A system according to claim 1, wherein the control device is connected with consumers by way of an interface, and the control device comprises consumption management that regulates the flow of energy from a wind energy system to consumers, as a function of the operating state of the wind energy system.

8. A system according to claim 7, wherein the interface between the control device and consumers comprises radio transmission of the control and regulation signals.

9. A system according to claim 7, wherein a measurement point is provided in a transition region between a house network and a power network of a utility company, which point is connected with the control device by way of a data channel and transmits data concerning power flow at a transfer point over this channel.

10. The system according to claim 7, wherein a load resistor is added as an additional consumer, to prevent feed of excess energy into the power network, and wherein heat that occurs at the load resistor is used for heating hot water or for heating.

11. The system according to claim 1, wherein a heat pump is added as an additional consumer, to avoid feeding excess energy into the power network, and wherein the heat pump is used for heating or cooling.

12. A feed converter system for small wind energy systems, comprising:
    a housing;
    a rectifier device disposed in the housing;
    an inverter device disposed in the housing; and
    a common control device for regulating system components under different load cases,
    wherein the control device is programmed to allow a deviation from the optimal operating point for a short time, during rapid increases of a speed of rotation or of the output of a synchronous generator, and then slowly returns to the optimal operating point.

* * * * *